(12) United States Patent
Bertoncello et al.

(10) Patent No.: US 12,195,052 B2
(45) Date of Patent: *Jan. 14, 2025

(54) GAP BLOCKING SYSTEMS AND METHODS FOR AMUSEMENT PARK ATTRACTIONS

(71) Applicant: Universal City Studios LLC, Universal City, CA (US)

(72) Inventors: James Anthony Bertoncello, Orlando, FL (US); Michael David Russell, Jr., Orlando, FL (US); Fred Calvin Wainwright, Jr., Orlando, FL (US); Brad Borgman, Orlando, FL (US); Daniel Coats, Orlando, FL (US); Michael Gordon, Orlando, FL (US); Kenneth D. Salter, Orlando, FL (US); Frank Weigand, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,943

(22) Filed: Mar. 6, 2023

(65) Prior Publication Data

US 2023/0202532 A1    Jun. 29, 2023

Related U.S. Application Data

(63) Continuation of application No. 16/786,539, filed on Feb. 10, 2020, now Pat. No. 11,613,278.

(Continued)

(51) Int. Cl.
*B61B 1/02*    (2006.01)
*A63G 4/00*    (2006.01)
(Continued)

(52) U.S. Cl.
CPC .......... *B61B 1/02* (2013.01); *A63G 4/00* (2013.01); *A63G 31/00* (2013.01); *A63G 31/02* (2013.01);
(Continued)

(58) Field of Classification Search
CPC .......... A63G 4/00; A63G 31/00; A63G 31/02; B61B 1/02; B66B 21/10; B65G 47/00
(Continued)

(56) References Cited

U.S. PATENT DOCUMENTS 368,420 A    8/1887    Pearsons
922,052 A    5/1909    Sherk
(Continued)

FOREIGN PATENT DOCUMENTS

CN    102309853 A    1/2012
CN    103153412 A    6/2013
(Continued)

OTHER PUBLICATIONS

Accessible Amusement Rides—A Summary of Accessibility Guidelines, United States Access Board, Jun. 2003, 18 pgs.
(Continued)

*Primary Examiner* — Kien T Nguyen
(74) *Attorney, Agent, or Firm* — Fletcher Yoder P.C.

(57) ABSTRACT

A gap blocking system includes a loading platform having a gap separating a first portion of the loading platform from a second portion of the loading platform. A ride vehicle is coupled to a transport extending through the gap. The gap blocking system also includes a panel assembly coupled to the loading platform and comprising a plurality of panels, wherein each panel of the plurality of panels is coupled to a respective biasing mechanism coupled to the first portion of the loading platform and configured to bias each panel (Continued)

towards a closed configuration in which each panel extends radially away from the first portion of the loading platform.

18 Claims, 6 Drawing Sheets

Related U.S. Application Data

(60) Provisional application No. 62/858,663, filed on Jun. 7, 2019, provisional application No. 62/849,542, filed on May 17, 2019, provisional application No. 62/827,144, filed on Mar. 31, 2019.

(51) Int. Cl.
| | |
|---|---|
| *A63G 31/00* | (2006.01) |
| *A63G 31/02* | (2006.01) |
| *B60R 21/01* | (2006.01) |
| *B61B 3/00* | (2006.01) |
| *B61L 1/00* | (2006.01) |
| *B61L 1/04* | (2006.01) |
| *A63G 31/16* | (2006.01) |
| *B60R 21/00* | (2006.01) |

(52) U.S. Cl.
CPC .............. *B60R 21/01* (2013.01); *B61B 3/00* (2013.01); *B61L 1/00* (2013.01); *B61L 1/04* (2013.01); *A63G 31/007* (2013.01); *A63G 31/16* (2013.01); *B60R 2021/0097* (2013.01)

(58) Field of Classification Search
USPC .................................. 472/117, 128, 129, 43
See application file for complete search history.

(56) References Cited

U.S. PATENT DOCUMENTS

| | | | |
|---|---|---|---|
| 929,130 A | 7/1909 | Helliesen |
| 1,098,298 A | 5/1914 | Porth |
| 1,116,160 A | 11/1914 | Swedberg |
| 1,216,560 A | 2/1917 | Gallinant |
| 1,531,118 A | 3/1925 | McManus |
| 2,168,061 A | 8/1939 | Christie et al. |
| 3,095,216 A | 6/1963 | Browne et al. |
| 3,727,558 A | 4/1973 | Winkle |
| 3,730,361 A | 5/1973 | Haynes |
| 3,791,308 A | 2/1974 | Hartz |
| 3,865,041 A | 2/1975 | Bacon |
| 4,308,697 A | 1/1982 | Guppy |
| 4,347,791 A | 9/1982 | Mandros |
| 4,369,984 A | 1/1983 | Hagen |
| 4,488,326 A | 12/1984 | Cherry |
| 4,543,886 A | 10/1985 | Spieldiener et al. |
| 4,694,522 A | 9/1987 | Alten |
| 4,759,682 A | 7/1988 | Hood |
| 5,033,392 A | 7/1991 | Schemitsch |
| 5,150,659 A | 9/1992 | Bickel |
| 5,161,104 A | 11/1992 | Fox et al. |
| 5,197,923 A | 3/1993 | Barber |
| 5,357,869 A | 10/1994 | Barjolle et al. |
| 5,453,053 A | 9/1995 | Danta et al. |
| 5,463,962 A | 11/1995 | Gnezdilov |
| 5,558,198 A | 9/1996 | Juarez |
| 5,560,468 A | 10/1996 | Inoue |
| 5,810,147 A | 9/1998 | Vanmoor |
| 5,832,555 A | 11/1998 | Saucier et al. |
| 5,845,580 A | 12/1998 | Muller et al. |
| 5,845,582 A | 12/1998 | Coester et al. |
| 5,931,288 A | 8/1999 | Avery |
| 5,994,644 A | 11/1999 | Rindoks et al. |
| 6,220,171 B1 | 4/2001 | Hettema et al. |
| 6,352,034 B1 | 3/2002 | Bolliger et al. |
| 6,440,002 B1 | 8/2002 | Jackson |
| 6,595,344 B1 | 7/2003 | Davis et al. |
| 6,880,301 B2 | 4/2005 | Hahn et al. |
| 6,898,816 B2 | 5/2005 | Tholen et al. |
| 7,354,351 B2 | 4/2008 | Edwards |
| 7,762,895 B2 | 7/2010 | Zamperla et al. |
| 7,784,405 B2 | 8/2010 | Rose et al. |
| 7,802,337 B2 | 9/2010 | van Roosmalen et al. |
| 7,802,521 B2 | 9/2010 | Gunes |
| 7,908,976 B2 | 3/2011 | Pujol |
| 8,020,496 B1 | 9/2011 | Maysonet |
| 8,141,495 B2 | 3/2012 | Baker et al. |
| 8,375,864 B1 | 2/2013 | Crawford et al. |
| 8,556,283 B2 | 10/2013 | Coochesfahani |
| 8,601,953 B2 | 12/2013 | Hachet et al. |
| 9,505,330 B2 | 11/2016 | Hirtenlehner et al. |
| 9,932,045 B2 | 4/2018 | Geddie et al. |
| 10,065,123 B2 | 9/2018 | Zamperla |
| 10,099,708 B2 | 10/2018 | Krueger |
| 10,106,069 B2 | 10/2018 | Rasekhi |
| 10,183,844 B1 | 1/2019 | Howes |
| 10,279,274 B1 | 5/2019 | Brister et al. |
| 10,427,059 B1 | 10/2019 | Goddard et al. |
| 10,800,435 B2 | 10/2020 | Shi et al. |
| 2001/0042489 A1 | 11/2001 | Yamaguchi et al. |
| 2003/0070576 A1 | 4/2003 | Vicent-Genod |
| 2008/0134930 A1 | 6/2008 | Drago |
| 2009/0017927 A1 | 1/2009 | Shozi et al. |
| 2009/0120319 A1 | 5/2009 | Muller et al. |
| 2009/0272289 A1 | 11/2009 | Baker et al. |
| 2010/0043664 A1 | 2/2010 | Winkelmann et al. |
| 2010/0058949 A1 | 3/2010 | Lomberty et al. |
| 2010/0078291 A1 | 4/2010 | Fritsche |
| 2010/0282121 A1 | 11/2010 | Switzeny |
| 2013/0059670 A1 | 3/2013 | Crawford et al. |
| 2017/0240356 A1 | 8/2017 | Benedict |
| 2018/0339672 A1 | 11/2018 | Kubiak et al. |
| 2019/0070515 A1 | 3/2019 | Grogan et al. |
| 2019/0239587 A1 | 8/2019 | Klein-Kassab |
| 2019/0368142 A1* | 12/2019 | Philpott ............ E01F 13/048 |
| 2022/0266875 A1 | 8/2022 | Laffin |

FOREIGN PATENT DOCUMENTS

| | | |
|---|---|---|
| CN | 203543951 U | 4/2014 |
| CN | 105555617 A | 5/2016 |
| CN | 107073337 A | 8/2017 |
| DE | 3142790 | 5/1983 |
| EP | 1201280 B1 | 4/2008 |
| EP | 2295123 A1 | 3/2011 |
| JP | S4821479 A | 6/1973 |
| JP | H09108090 A | 4/1997 |
| JP | 2003182564 A | 7/2003 |
| JP | 2004268634 A | 9/2004 |
| JP | 4167132 B2 | 10/2008 |
| JP | 2008279942 A | 11/2008 |
| JP | 5401084 B2 | 1/2014 |
| JP | 2016074313 A | 5/2016 |
| KR | 20010082872 A | 8/2001 |
| WO | 2005007479 A1 | 1/2005 |
| WO | 2005077479 A1 | 8/2005 |
| WO | 2005108161 A1 | 11/2005 |
| WO | 2010027239 A2 | 3/2010 |
| WO | 2017201435 A1 | 11/2017 |
| WO | 2020164854 A1 | 8/2020 |

OTHER PUBLICATIONS

World's First Freeform Escalator, https://www.youtube.com/watch?v=x58272OirGU, Published Oct. 1, 2010, Publisher Laboratory Equipment (1:48 minutes).

Super Escalator Adventure-ONLY in Japan, https://www.youtube.com/watch?v=P6pKmISsUTo, published Mar. 11, 2013, Publisher ONLY in Japan (4:20 minutes).

Hydra the Revenge off-ride HD Dorney Park, https://www.youtube.com/watch?time_continue=35&v=xNNfmFupb04, published Jun. 26, 2015, Publisher CoasterForce (5:58 minutes).

Platform Gap Filler, Website: https://en.wikipedia.org/wiki/Platform_gap_filler, pp. 1-3 (Accessed on Nov. 1, 2017).

(56) References Cited

OTHER PUBLICATIONS

PCT/US2020/018774 International Search Report and Written Opinion Jun. 25, 2020.
PCT/US2020/021192 International Search Report and Written Opinion May 27, 2020.
PCT/US2020/021092 International Search Report and Written Opinion May 27, 2020.
JP Office Action for Japanese Application No. 2021-557891 mailed Dec. 27, 2023.
JP Office Action for Japanese Application No. 2021-558804 mailed Feb. 8, 2024.
SG Office Action for Singapore Application No. 11202109772V mailed Mar. 13, 2023.
SG 111202109767R Search Report dated Jun. 28, 2022.
CN Office Action for Chinese Application No. 202080026434.2 mailed Mar. 13, 2024.
CN Office Action for Chinese Application No. 202080026435.7 mailed Mar. 18, 2024.

* cited by examiner

FIG. 5

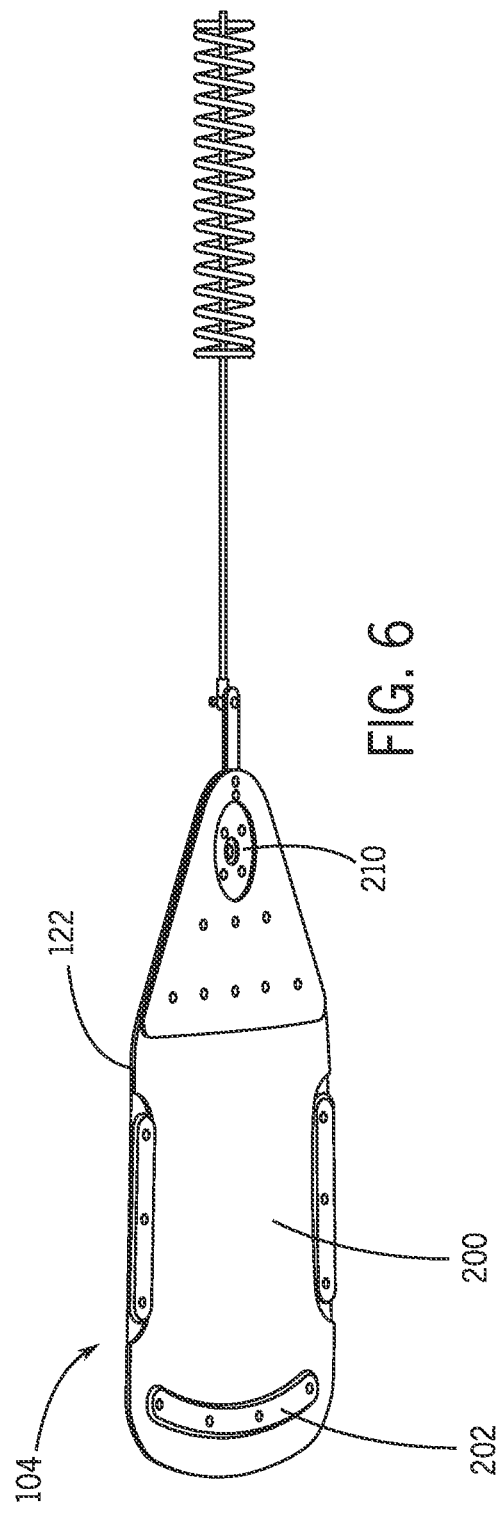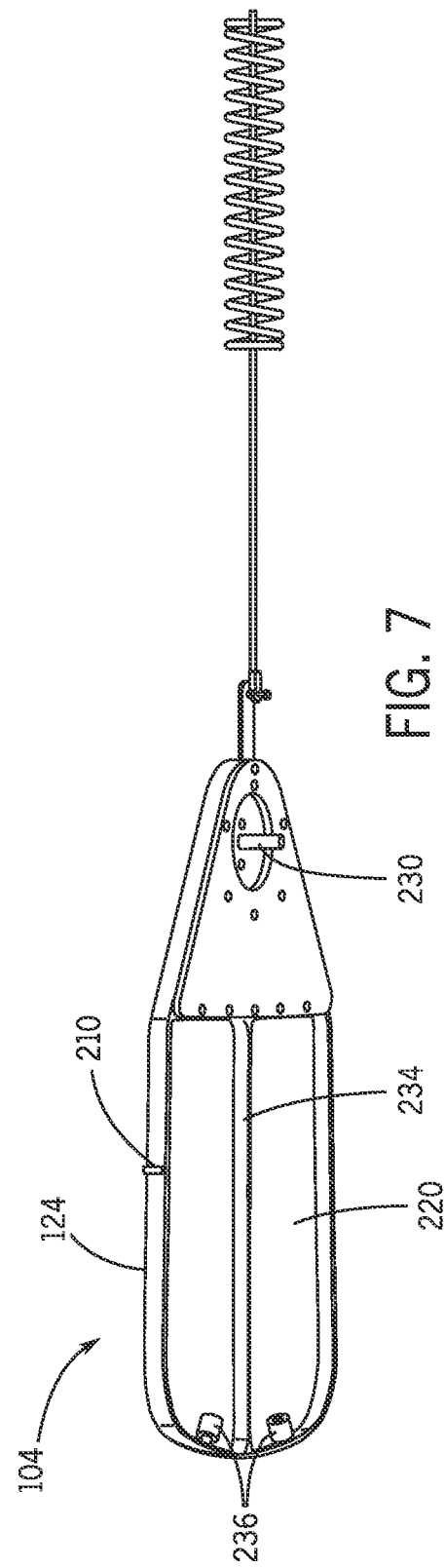

GAP BLOCKING SYSTEMS AND METHODS FOR AMUSEMENT PARK ATTRACTIONS

CROSS-REFERENCE TO RELATED APPLICATIONS

This application claims priority to and the benefit of U.S. patent application Ser. No. 16/786,539, entitled "FALL HAZARD PREVENTION SYSTEMS FOR AMUSEMENT PARK ATTRACTIONS," filed Feb. 10, 2020, which claims priority to and the benefit of U.S. Provisional Application No. 62/827,144, entitled "FALL HAZARD PREVENTION SYSTEMS FOR AMUSEMENT PARK ATTRACTIONS," filed Mar. 31, 2019, to U.S. Provisional Application No. 62/849,542, entitled "FALL HAZARD PREVENTION SYSTEMS FOR AMUSEMENT PARK ATTRACTIONS," filed May 17, 2019, and to U.S. Provisional Application No. 62/858,663, entitled "FALL HAZARD PREVENTION SYSTEMS FOR AMUSEMENT PARK ATTRACTIONS," filed Jun. 7, 2019, which are hereby incorporated by reference in their entireties for all purposes.

BACKGROUND

The present disclosure relates generally to amusement park ride systems for amusement parks. More particularly, embodiments of the present disclosure relate to systems and methods for blocking access to gaps in certain amusement park ride systems.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Recently, there has been a growing interest in increasing an efficiency of loading passengers (e.g., guests) into ride vehicles of attractions of amusement parks. Accordingly, some attractions may include a loading system having a loading platform that permits passengers to unload from a ride vehicle and/or to load into the ride vehicle while the ride vehicle moves along a loading path. Certain locations along the loading platform are typically permanently blocked with barriers (e.g., railing) to prevent guests from moving out of the loading platform and onto, for example, a track of the attraction or another location where the guests should not be. Other locations along the loading platform may include uncovered gaps that are not permanently blockable with barriers. For example, such uncovered gaps generally permit the ride vehicle and/or components propelling the ride vehicle to travel along the loading path without interference with the loading platform. However, passengers loading/unloading from the ride vehicle and/or other guests walking across the loading platform may lose items in such uncovered gaps along the loading platform.

SUMMARY

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a gap blocking system includes a loading platform having a gap separating a first portion of the loading platform from a second portion of the loading platform. A ride vehicle is coupled to a transport extending through the gap, where the transport is configured to propel the ride vehicle along a loading path adjacent to the loading platform. The gap blocking system also includes a panel assembly coupled to the loading platform and comprising a plurality of panels, wherein each panel of the plurality of panels is coupled to a respective biasing mechanism coupled to the first portion of the loading platform and configured to bias each panel towards a closed configuration in which each panel extends radially away from the first portion of the loading platform. The gap blocking system also includes a stationary post coupled to the loading platform and positioned within the gap, wherein the stationary post is configured to contact and exert an opposing force on at least one individual panel of the plurality of panels to overcome a biasing force of the biasing mechanism and to move the at least one individual panel out of the closed configuration into an open configuration expose a portion of the gap to permit entry of the ride vehicle into the exposed portion of the gap.

In an embodiment, a method of operating a gap blocking system includes the steps of providing a plurality of panels extending radially from a loading platform to block access to a gap formed between portions of the loading platform. The method also includes moving a moving portion of the loading platform to contact at least one individual panel of the plurality of panels with a stationary post coupled to the loading platform, wherein the contacting overcomes a biasing force of a biasing mechanism of the at least one individual panel to cause the at least one individual panel to move from a closed configuration into an open configuration, wherein the contacting causes the at least one individual panel to slide over or under an adjacent panel. The method also includes controlling a ride vehicle to enter an opening providing access to the gap created by the at least one individual panel being in the open configuration.

In an embodiment, a gap blocking system includes a loading platform having a gap separating a first portion of the loading platform from a second portion of the loading platform, wherein the first portion of the loading platform comprises a moving portion. The gap blocking system includes a panel assembly coupled to the moving portion and comprising a plurality of panels configured to rotate with the rotating turntable, wherein each panel of the plurality of panels is coupled to a respective biasing mechanism coupled to the first portion of the loading platform and configured to bias each panel towards a closed configuration in which each panel extends radially away from the first portion of the loading platform, wherein the plurality of panels are arranged to alternate between a first type of panel and a second type of panel such that the first type of panel is positioned to overlap a portion of respective top surfaces of adjacent panels of the second type when the plurality of panels are in the closed configuration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a perspective view of ride vehicle entry interaction with a panel assembly in a ride system that includes the gap blocking system, in accordance with aspects of the present disclosure;

FIG. 6 is a perspective bottom view of an embodiment of a top-type panel of a panel assembly for use in conjunction with the gap blocking system, in accordance with aspects of the present disclosure; and FIG. 7 is a perspective bottom view of an embodiment of a lower-type panel of a panel assembly for use in conjunction with the gap blocking system, in accordance with aspects of the present disclosure.

DETAILED DESCRIPTION

Figure 1:
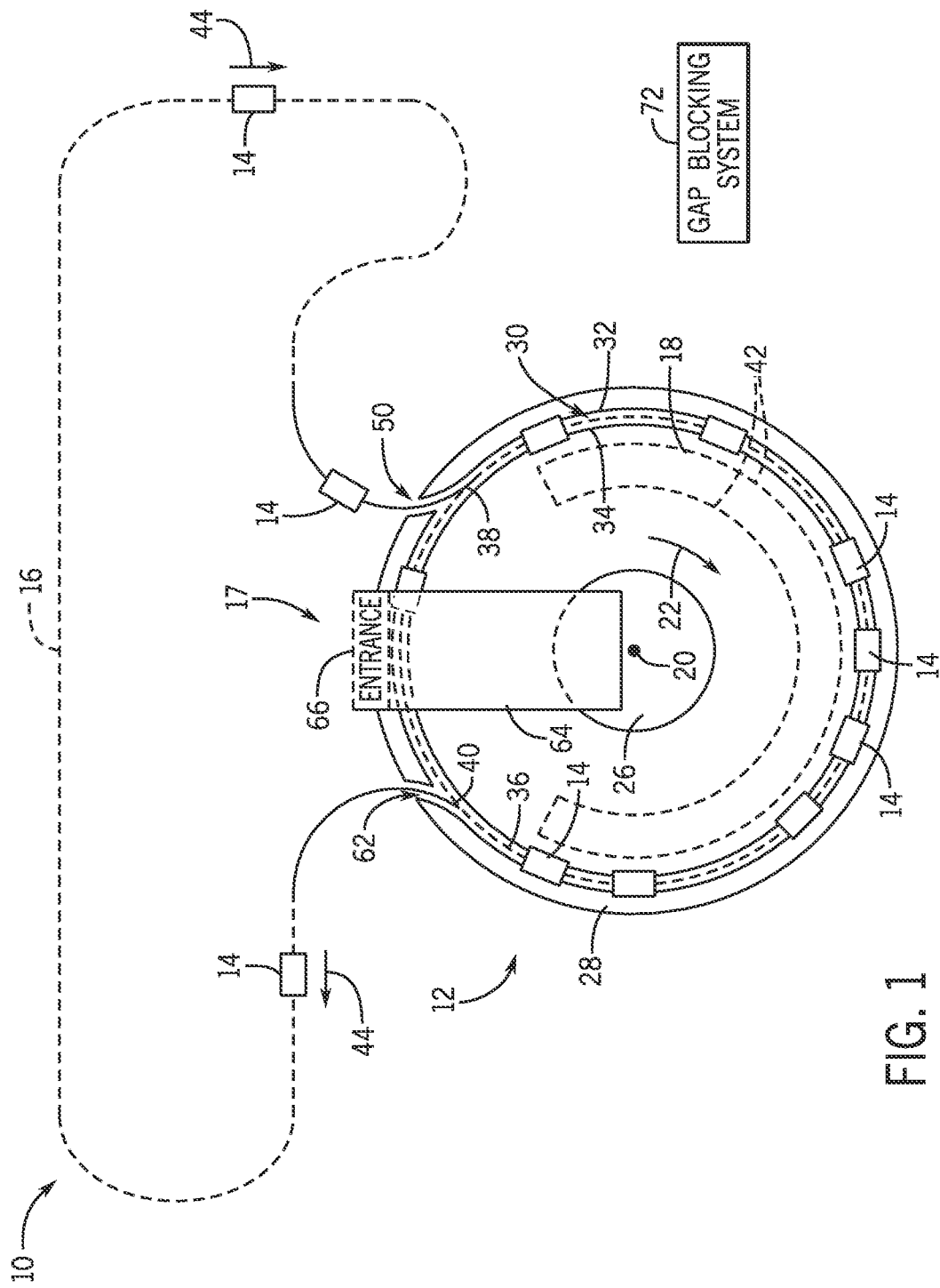
FIG. 1 is a schematic top view of an embodiment of a portion of a ride system that may include a gap blocking system, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain amusement park attractions may include loading systems that permit passengers to load into and/or to unload from ride vehicles of the attractions while the ride vehicles travel along the loading system. As the ride vehicles enter a loading area of the attraction, the ride vehicles may slow down but continue moving at a relatively low speed along a track or path while passengers exit the vehicles and as new passengers are loaded onto the vehicles. The system may include a loading platform having a moving portion. The loading platform may include a turntable, a conveyor belt, or, as discussed below, as an in-line or linear platform, which is stationary or that is configured to move relative to fixed portions of the loading platform, e.g., to rotate about an axis (e.g., a central vertical axis) about which the vehicles move. In an embodiment, a stationary outer platform or wall may be disposed about a portion of the turntable or substantially all of the turntable to form a gap between the moving portion and the outer platform or wall. The gap may define a loading path along which ride vehicles may travel during loading and/or unloading of passengers from the ride vehicles. Portions of the gap adjacent to or otherwise surrounding the ride vehicles may permit passengers to lose items (e.g., keys, coins, cellular phones) in the gap. While certain embodiments of the disclosure are discussed in the context of a turntable loading platform, it should be understood that the disclosed embodiments may be applied to other configurations of the loading platform, such a conveyer system that may be implemented in a linear or nonlinear configuration.

Therefore, embodiments of the present disclosure are directed to a gap blocking system that is configured to block access to the gap, while also permitting ride vehicles to move along or within the gap during operation of the loading system. Further, the gap blocking system permits entry of individual ride vehicles from the attraction path into the loading path while maintaining closure of a majority of the gap. As provided herein, the gap blocking system includes a passive panel assembly. The panel assembly is configured to block the gap between a first section of a loading platform (e.g., a loading turntable, belt, linear moving platform) and a second or outer section of the loading platform to substantially eliminate or close a gap that may be present, while nonetheless permitting ride vehicles to travel along the gap during operation of the loading system. For example, the panel assembly includes a plurality of panels that may be coupled to the turntable and that are configured to rotate together with the turntable and about the same axis. The panels may be biased via a spring, cam profile gasket, or other biasing mechanism towards the closed configuration in which an individual panel extends to a receiving surface on the outer platform. When an opposing force is applied to one or more individual panels, those panels transition from the closed configuration into an open configuration. Accordingly, the gap blocking system including the panel assembly may permit ride vehicles to travel along the loading system to receive and/or unload passengers at any suitable location along the turntable, while access to the gap is substantially blocked by the passive panels. These and other features will be described below with reference to the drawings.

While the present disclosure describes the embodiments of the gap blocking system (e.g., the panel assembly) as configured for use in an amusement park setting, it should be appreciated that the disclosed embodiments of the gap blocking system may be implemented to selectively block access to various gaps that may be present in a variety of industrial settings. For example, embodiments of the gap blocking system discussed herein may be used to block access to gaps that may be present in various conveyor systems or other devices utilized for moving components along a path (e.g., a track).

Turning now to the figures, FIG. 1 is a schematic of an embodiment of a ride system 10 (e.g., an attraction) of an amusement park. The ride system 10 includes a loading system 12 that facilitates loading and/or unloading of passengers (e.g., guests of the amusement park) into ride vehicles 14 of the ride system 10. For example, passengers may load into the ride vehicles 14 at the loading system 12, may travel along an attraction path 16 of the ride system 10, and may arrive back at the loading system 12 to unload from the ride vehicles 14. While traveling along the attraction path 16, passengers may be exposed to a variety of experiences, such as virtual reality, alternate reality, environment interactions, multiple ride paths, water features, special effects, and so forth. It should be noted that portions of the ride system 10, such as the attraction path 16, have been intentionally simplified to focus on aspects of the loading system 12.

In the depicted embodiment, the loading system 12 includes a loading platform 17 having a turntable 18 (e.g., a first portion of the loading platform 17) that is configured to rotate (e.g., at a substantially constant rotational speed) about an axis 20. However, it should be understood that the embodiments disclosed herein may also be used with a stationary loading platform that does not rotate. In the illustrated embodiment, the turntable 18 is substantially circular and rotates in a clockwise direction 22 about the axis 20. However, in other embodiments, the turntable 18 may be any suitable shape, which may correspond to a theme of the ride system 10, and may rotate in a counter-clockwise direction about the axis 20. Moreover, in certain embodiments, the turntable 18 may be replaced with a belt or other track system (e.g., a linear platform and associated track system) that is configured to travel along a linear path or along another predetermined path (e.g., a non-symmetric path). In some embodiments, the turntable 18 may include a stationary portion 26 disposed therein, which is not configured to rotate about the axis 20. That is, the turntable 18 may include a generally annular shape and may be disposed about the stationary portion 26, such that the turntable 18 may rotate about the axis 20 relative to the stationary portion 26.

As shown in the illustrated embodiment, the turntable 18 is at least partially circumscribed by an outer platform 28 (e.g., a second portion of the loading platform 17), which, in some embodiments, is configured to remain stationary relative to the axis 20. The outer platform 28 may be spaced apart from the turntable 18, such that a gap 30 is formed between an inner edge 32 of the outer platform 28 and an outer edge 34 of the turntable 18. The attraction path 16 may be coupled to a loading path 36 that extends along the gap 30 and about the axis 20. Particularly, the loading path 36 may extend along the gap 30 between an initiating end 38 and terminal end 40. In one embodiment, the loading path 36 may form a portion of the overall attraction path 16. As discussed in detail below, passengers may load into and/or unload from the ride vehicles 14 along the loading path 36. A portion of the turntable 18 that is positioned adjacent to the loading path 36 at a particular instance in time will be referred to herein as a loading zone 42 of the loading system 12 (e.g., the loading zone 42 may be indicative of a region of the turntable 18 outlined by the illustrated phantom lines).

The ride vehicles 14 may travel along the attraction path 16 in a direction of travel 44. The ride vehicles 14 may enter the loading path 36 via an entry avenue 50 (e.g., a path or passage) that may be formed within the outer platform 28. In some embodiments, the loading path 36 extends about the axis 20 of the turntable 18 (e.g., the loading path 36 has a radius extending from the axis 20). As such, the ride vehicles 14 may travel in conjunction with (i.e., together with or at the same speed as) the turntable 18 along a length of the loading path 36. For example, while traveling along the loading path 36, the ride vehicles 14 may travel at substantially the same speed about the axis 20 as the rotational speed of the turntable 18 about the axis 20. In this manner, a position and an orientation of each of the ride vehicles 14 along loading zone 42 of the turntable 18 may remain substantially constant. In other words, each ride vehicle 14 may maintain a temporarily fixed position relative to a circumference of the turntable 18 while traveling along the loading path 36 and while the turntable 18 rotates about the axis 20. In this manner, the loading system 12 may substantially maintain an orientation of the turntable 18 relative to the ride vehicles 14, which may include seats facing towards the outer edge 34, while the ride vehicles 14 travel along the loading path 36. Accordingly, passengers may board into the ride vehicles 14 from the loading zone 42 or may unload from the ride vehicles 14 onto the loading zone 42 without having to walk along a particular ride vehicle 14 to adjust to a speed of the ride vehicle 14 during such loading/unloading procedures. It should be understood that, in certain embodiments, respective speeds of the ride vehicles 14 along the loading path 36 may be less than an average speed of the ride vehicles 14 along a remaining portion of the attraction path 16. The passive design of the components of the gap blocking system as provided herein can accommodate dissimilar speeds of travel and still achieve gap protection. Upon completion of loading/unloading procedures, the ride vehicles 14 may exit the loading path 36 via an exit avenue 62 adjacent to the initiating end 40 of the attraction path 16.

As shown in the illustrated embodiment, an entrance ramp 64 may extend between an entrance 66 of the ride system 10 and the stationary portion 26 of the loading system 12. In some embodiments, the entrance ramp 64 may be any suitable angled path, which may include stairs, a substantially flat angled surface, an escalator, an elevator, or any combination thereof. Accordingly, guests may enter (e.g., walk onto) the stationary portion 26 from the entrance 66 while certain ride vehicles 14 or other moving components of the loading system 12 travel about the axis 20 (e.g., beneath the entrance ramp 64). Generally, guests may, from the stationary portion 26, step onto the loading zone 42 of the turntable 18, and subsequently board into a particular one of the ride vehicles 14 traveling along the loading zone 42. It should be understood that, to exit the ride system 10, guests may dismount from the ride vehicles 14 onto the loading zone 42, walk toward the stationary portion 26, and may subsequently exit the loading system 12 via the entrance ramp 64.

Figure 2:
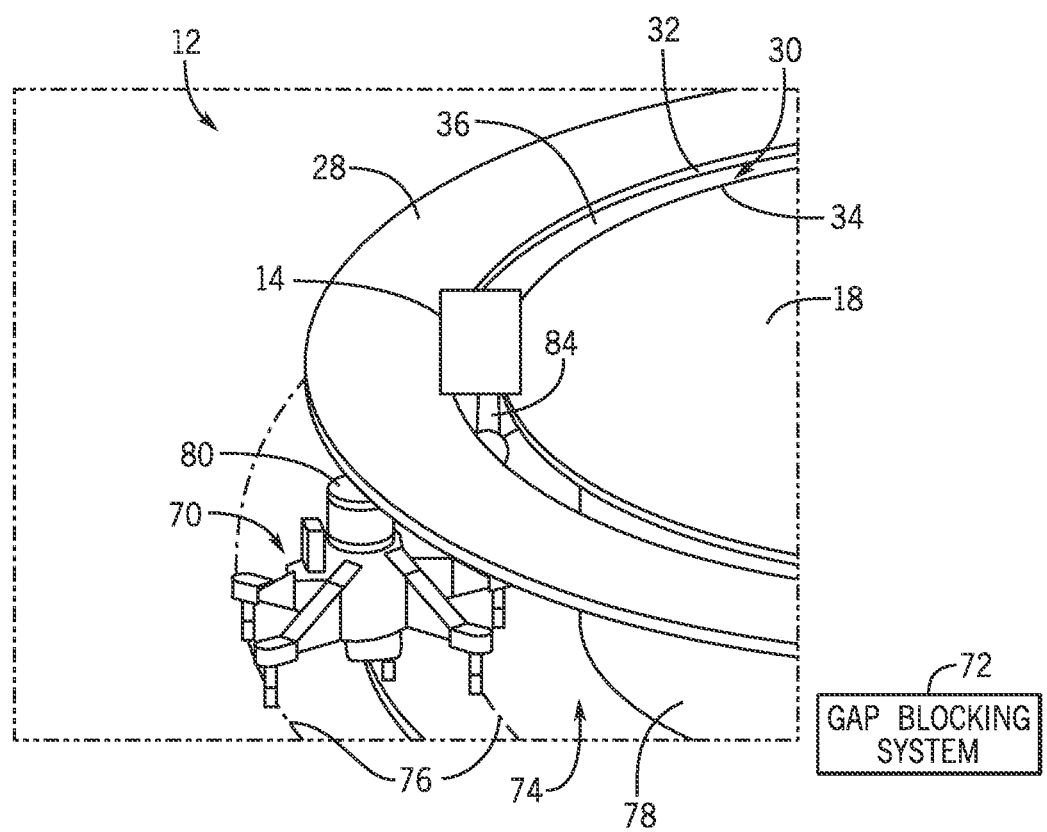
FIG. 2 is a perspective view of an embodiment of a ride system that may include a gap blocking system, in accordance with aspects of the present disclosure.

The ride vehicles 14 travel along the loading path in a track-based or trackless system. In an embodiment, each of the ride vehicles 14 traveling along the loading path 36 may be associated with a respective transport 70, as shown in FIG. 2, which is configured to propel the ride vehicles 14 along the loading path 36 and about the axis 20. In certain embodiments, the transport 70 may be disposed partially beneath the turntable 18 and/or the outer platform 28 and may be coupled to a particular ride vehicle 14 via a support structure extending through the gap 30. Indeed, the gap 30 may permit the transport 70 to couple to and propel a corresponding ride vehicle 14 along the loading path 36. Unfortunately, the gap 30 may permit guests loading and/or unloading from the ride vehicles 14 or otherwise walking adjacent to the loading path 36 to accidentally lose certain items (e.g., keys, coins, cellular phones) in the gap 30 by dropping the items into the gap 30. Accordingly, embodiments of the ride system 10 discussed herein are equipped with a gap blocking system 72 that is configured to substantially block guest access to the gap 30. More specifically, the gap blocking system 72 is configured to selectively block guest access to portions of the gap 30 that are not occupied by components of the ride vehicles 14 or otherwise covered by the ride vehicles 14 (e.g., covered by respective chassis of the ride vehicles 14). Accordingly, the gap blocking system 72 may permit the ride vehicles 14 to continuously move along the loading path 36 while substantially eliminating a likelihood of guests losing items in the gap 30.

Further, the disclosed gap blocking system 72 is capable of accommodating irregular spacing between the ride vehicles 14, as shown in FIG. 1. In contrast to less flexible or configurable types of systems, the passive gap blocking system 72 does not rely on predictable spacing between the ride vehicles 14. Accordingly, the gap blocking system 72 provides the benefit of gap blocking with variable speeds or spacing between ride vehicles 14.

To better illustrate the transport 70 and to facilitate the subsequent discussion of the gap blocking system 72 as used in conjunction with the transport 70, FIG. 2 is a perspective view of an embodiment of the loading system 12. As shown in the illustrated embodiment, the transport 70 is positioned in a space 74 beneath the turntable 18 and/or the outer platform 28 and is engaged with a guide track 76. The guide track 76 may extend about a frame 78 supporting the turntable 18 and permit the transport 70 to propel along the guide track 76 about the axis 20. In some embodiments, the guide track 76 and the loading path 36 may include the same path or track structure. A robotic manipulator 80 may couple the transport 70 to one of the ride vehicles 14, to permit the transport 70 to move the ride vehicle 14 along the loading path 36. As shown in the illustrated embodiment, the robotic manipulator 80 may include a support structure 84 (e.g., a shaft) that extends through the gap 30 and engages with the ride vehicle 14. As such, the support structure 84 may facilitate coupling the ride vehicle 14 to the transport 70 positioned beneath the turntable 18 and/or the outer platform 28. For clarity, it should be understood that, as used herein, a "ride vehicle" may refer to any one or combination of components of the ride vehicle 14 (e.g., any one of the ride vehicles 14), the robotic manipulator 80, and/or the transport 70. The ride vehicle 14 may include a vehicle controller that controls movement of the vehicle 14 and its drive components to move the transport 70 onto and along the loading path 36.

Figure 3:
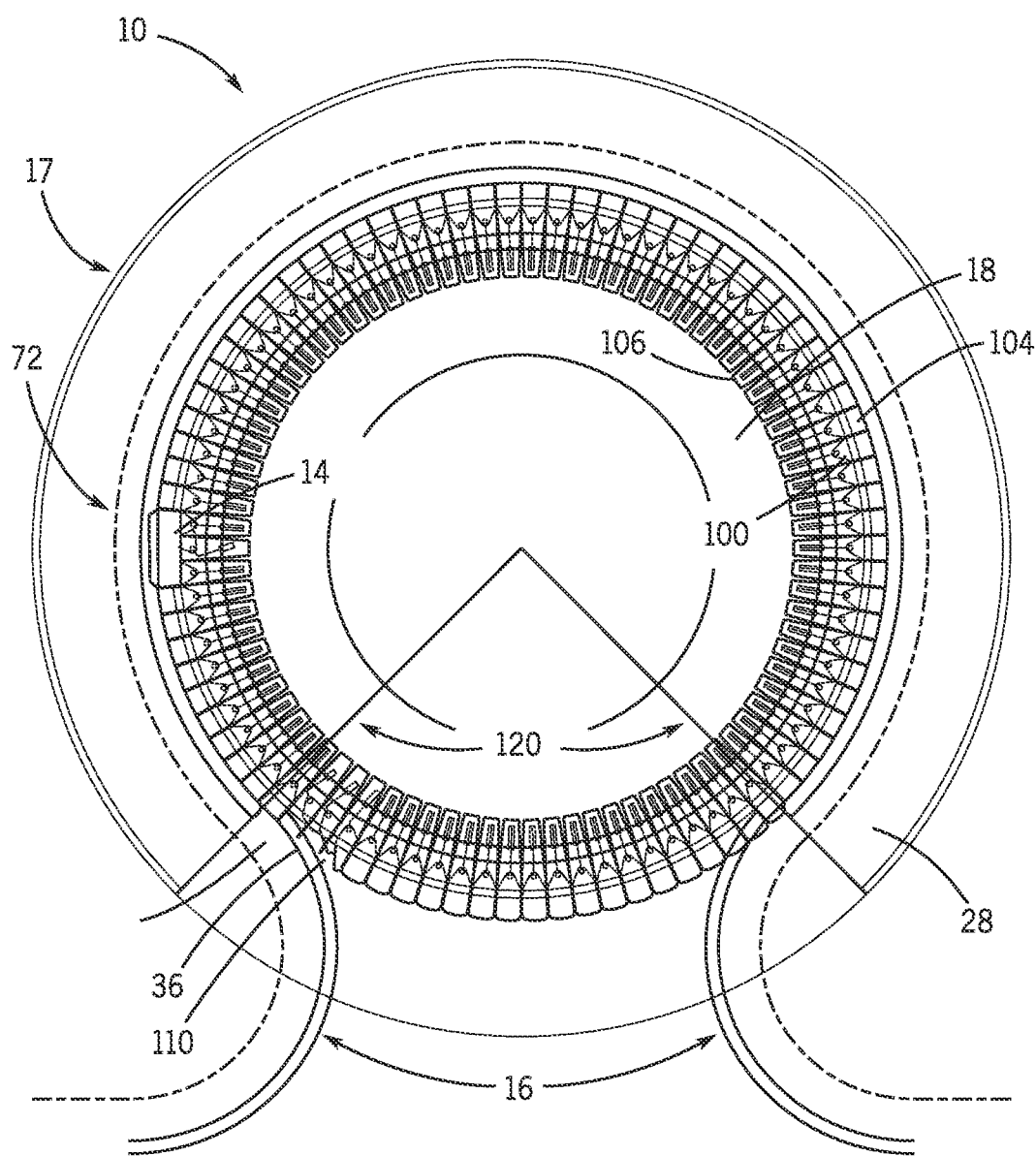
FIG. 3 is a schematic top view an embodiment of a portion of a gap blocking system, in accordance with aspects of the present disclosure.
Figure 4:
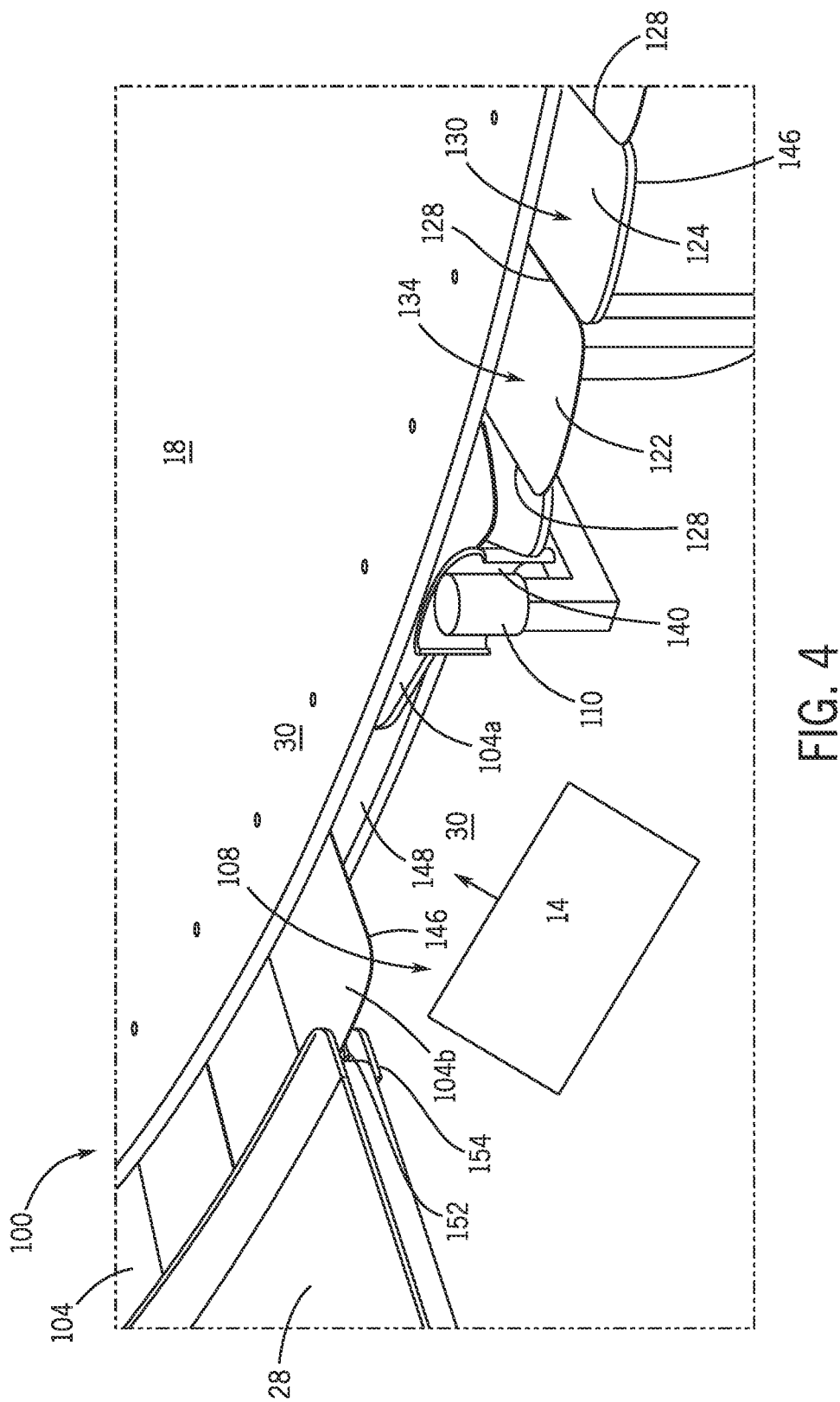
FIG. 4 is a perspective view of a ride vehicle entry point into a loading path for a ride system that includes the gap blocking system, in accordance with aspects of the present disclosure.

FIG. 3 is a schematic top view of an embodiment of the ride system 10 used in conjunction with the gap blocking system 72 and that includes a panel assembly 100 that functions to block the gap (e.g., gap 30 of FIG. 2). As discussed below, the panel assembly 100 includes a plurality of panels 104 that are configured to block portions of the gap that are not occupied by components of the ride vehicles 14 or otherwise temporarily opened to allow entry of ride vehicles 14 into the loading path. As such, the panel assembly 100 of the gap blocking system 72 may ensure that the gap remains covered during operation of the ride system 10. The panel assembly 100 includes a plurality of individual panels 104 coupled to a first section (e.g., the turntable 18) of the loading platform 17 and that are configured to extend between the first section and a second section (e.g., the outer platform 28) in a first or closed configuration to at least partially cover the gap. In embodiments in which the first section rotates, rotation of the turntable 18 causes the plurality of panels to rotate together with the turntable 18. Each individual panel 104 of the plurality of panels includes a biasing mechanism 106 that biases the panel 104 towards the outer section 28. As shown in FIG. 4, a stationary post 110 is positioned to extend from the loading platform into the loading path 36. As disclosed herein, the gap blocking system 72 creates a partial opening 108 that exposes the gap at a vehicle entry point to allow the ride vehicles 14 to enter the loading path 36 in a passive manner, meaning actuated equipment is not needed to create or maintain the opening 108. The stationary post 110 may be positioned along the loading path to create the openings 108 behind barriers or within an area 120 at the station edge that is inaccessible to guests.

FIG. 4 is a perspective view of the vehicle entry point into the opening 108. As discussed, the gap blocking system 72 includes passive panels 104 distributed about an outer diameter/edge of the turntable 18. The panels 104 may be arranged to alternate between a first type 122 and a second type 124, discussed in more detail in FIGS. 6-7, such that each panel 104 of the first type 122 is in direct contact with an adjacent panel 104 of the second type 124 about the circumference of the turntable 18. The panels 104 of the first type 122 may be generally arranged as an interrupted top layer such that lateral edges 128 of the first type 122 of panels 104 overlap a top surface 130 of the panels 104 of the second type 124. The percentage overlap may be at least 1%, 5%, 10%, 15%, 25%, or 50% of a surface area of the top surface 130 of the panels 104 of the second type 124. In the illustrated embodiment, the lateral edges 128 of the of the first type 122 of panels 104 are spaced apart from the lateral edges 128 of an adjacent panel 104 of the first type 122 such that at least a portion of top surface 130 of the second type 124 of panel 104 is exposed. Accordingly, in the default closed configuration, the panels 104 of the first type 122 do not directly contact other panels of the first type 122. Similarly, panels 104 of the second type 124 do not directly contact one another in the closed configuration. However, as discussed herein, to assume an open configuration, the panels 104 may move relative to one another to come into contact with nonadjacent panels 104 or panels of a same type. The top surface 130 may be relatively smooth to facilitate a sliding motion with adjacent panels.

The panels 104 may be gas-shock, e.g., spring, loaded to maintain a radial orientation as a default or closed configuration in the absence of any opposing forces. However, each individual panel 104 is capable of rotating out of the closed configuration allowing them to be rotated and then return to default closed configuration when the opposing force is removed. As the turntable rotates, each panel 104 in turn contacts a fixed mast or stationary post 110 that is attached to the loading platform 104 and fixed relative to any rotating portion (e.g., the turntable 18). This creates the opening 108 for vehicle entry and permits vehicles 14 to enter the loading path without necessarily having even or controlled spacing distance between the vehicles 14. Because each panel 104 or group of adjacent panels 104 is rotated in response to contact with the stationary post 110, new openings 108 are continuously passively created and subsequently passively closed if no vehicle 14 is present to enter the loading path at the opening 108. The ride vehicle 14 enters adjacent and downstream of the stationary post 110. The stationary post 110 may include a prow structure 140 that is sized and shaped to rotate a desired number of panels 104 to create the opening 108. The size and shape of the prow structure 140 may be dependent on a size and shape of components of the ride vehicle 14 (e.g., the support shaft 84) that extend through the gap 30.

As discussed, the panels 104 are coupled to the turntable 18 and spaced about a circumference of the turntable 18. Accordingly, the panels 104 may rotate together with the turntable 18. Each panel 104 may be configured to transition between a default extended or closed configuration illustrated by way of example as panel 104b, in which the panels 104b extends across the gap 30 to cover or substantially cover a respective portion of the gap 30 and an at least partially retracted or open configuration, illustrated by way of example as panel 104a in which the open panel 104a creates the opening 108 to expose a respective portion of the gap 30. As the panels 104 contact the stationary post 110, the panels slide over or under one another (depending on their arrangement) and out of the closed configuration. In the illustrated embodiment, radially outermost distal edges 146 of the panel 104 contact the prow 140 of the stationary post 110 to initiate the movement from the closed configuration to the open configuration. In one embodiment, the panel 104 may rotate underneath the turntable 18 to create the opening 108.

In some embodiments, the radially outermost distal edges 146 of the panels 104 may be configured to extend beneath the outer platform 28 or to extend into a receiving surface or groove 152 formed within the outer platform 28 when the panels 104 are in the extended positions. Accordingly, the panels 104 may span fully across a radial dimension of the gap 30 when in the extended positions. That is, a maximum radial extension of an individual panel 104 is in the closed configuration. In some embodiments, each of the panels 104 may assume a geometric shape that facilitates covering the gap 30 and/or engaging within the outer platform 28 when the panels 104 are in the extended positions. For example, the panels 104 may include generally trapezoidal shapes or generally arch-like shapes that permit the panels 104 to abut and/or overlap with one another in the extended positions to substantially cover the gap 30 (e.g., to mitigate or substantially eliminate a space between neighboring panels 104). Further, the panels 104 and/or the groove 152 may be sized and shaped such that the panels generally travel within and minimally contact the surfaces of the groove 152 during rotation of the turntable 18. However, the lower surface 154 may provide structural support to the panels 104 in the event that a weight is applied to the top surfaces 130, 134 of the panels.

Figure 5:
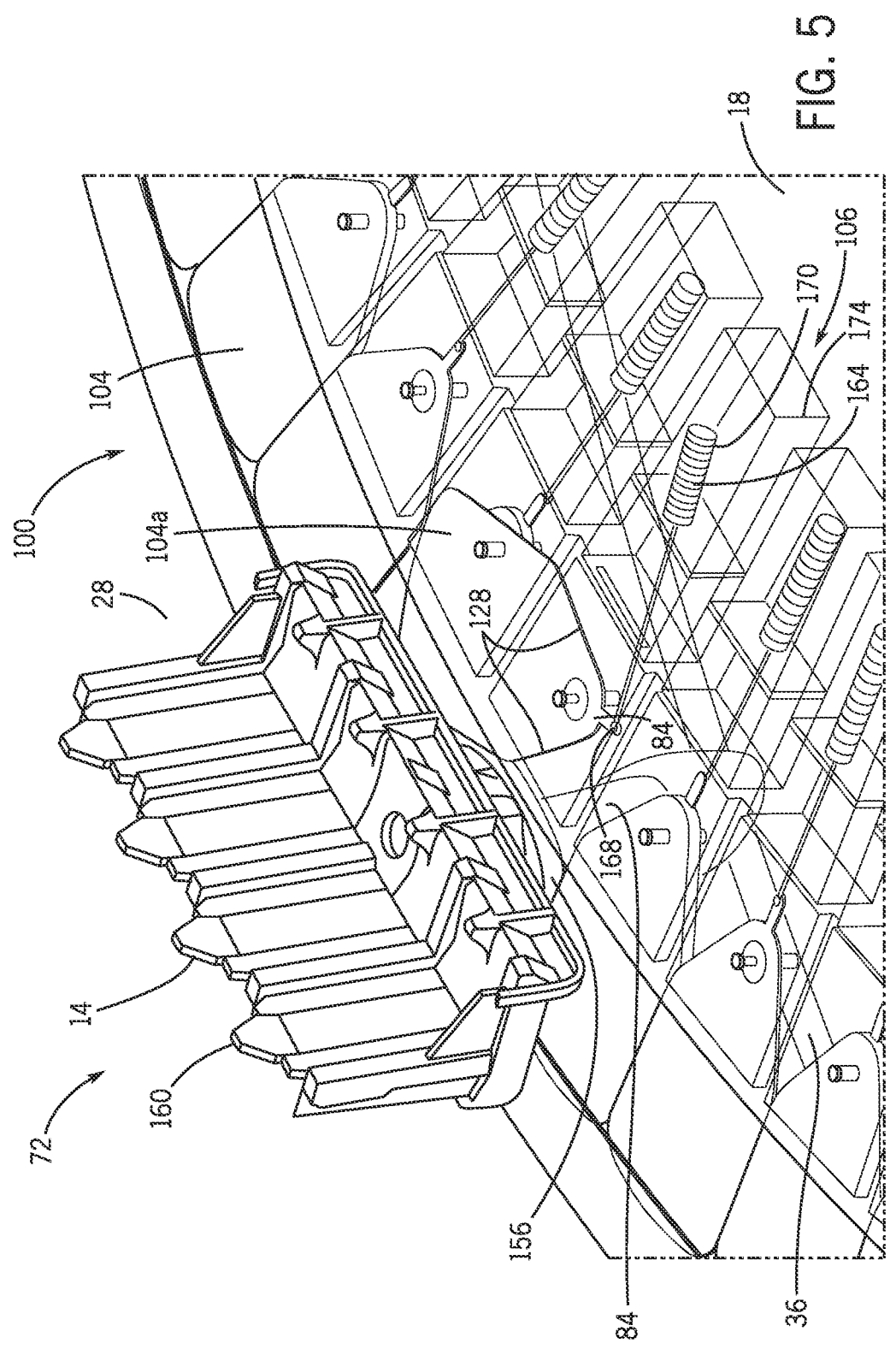

FIG. 5 is a perspective view of embodiments of the panel assembly 100 of the gap blocking system 72. Once the ride vehicle 14 enters the loading path 36, the ride vehicle 14 and the turntable 18 may rotate at approximately a same speed as the ride vehicle 14 travels. The ride vehicle travels away from the stationary post 110 at the entry opening 108. However, one or more rotated panels, e.g., panel 104a, in the open configuration settle onto a plow structure 156 present on the ride vehicle 14, as generally illustrated in FIG. 5, and rotate together with the ride vehicle 14. The plow structure is coupled to the support shaft 84 and is generally positioned underneath the seat/s 160 of the ride vehicle 14. Passive contact with the plow structure 156 maintains the panel 104a in an at least a partially open configuration as the ride vehicle 14 moves along the loading path 36. The plow structure 156 may be formed from a compliant material to reduce impact to the panels 104 during contact.

Transition of the panel 104a between the closed and open configuration may be facilitated by respective biasing mechanisms 106 coupled to each panel 104. Each panel 104 is coupled to a spring-loaded rod 164 at a joint 168 such that the panel 104 changes orientation relative to the rod 164 at the joint 168 to permit the panel to articulate within the plane of the floor surface and between the opened and closed configurations. An end 170 of the rod 164 is free to permit additional minor movements of the panel 104 in other planes. However, in an embodiment, the panels 104 are coupled to the turntable 18 such that, even within their individual ranges of motion, the panels 104 do not move to extend above a top surface of the loading platform. Such movements may be constrained by a cage 174 or other structure. The panel is biased to return to a default closed configuration when no opposing forces are applied to overcome the biasing force of the biasing mechanism 106. It should be understood that the biasing mechanism 106 may be a suitable spring-based or other mechanism (e.g., a passive mechanism) that permits movement to the open configuration upon contact with the stationary post 110 (FIG. 4) under normal operation of the system 10 and return to the closed configuration via rotation in the absence of opposing forces.

The panels 104 of the panel assembly 100 are positioned about the turntable 18 to generally cover or at least partially cover the space or gap between the turntable 18 and the stationary outer platform 28. The panels 104 are shaped and arranged so that the ride vehicles 14 and turntable 18 can move at least partially asynchronously, and the turntable 18 may rotate faster or slower than the vehicles 14 during at least a portion of its movement. During asynchronous movement, the panels 104 are capable of being deflected by the vehicles 14 in either direction, so that the opening or space between adjacent panels stays under the vehicle. That is, the panel assembly 100 permits reverse or forward motion of the ride vehicle 14 positioned within the panel assembly 100. Accordingly, the plow structure 156 may at least partially encircle the support shaft 84 to facilitate deflection of panels 104 in either direction. In addition, during a ride system shutdown scenario, ride vehicles 14 may stop or change speed to permit entry into the loading platform independent of whether the turntable 18 continues to rotate. In such cases, the spacing between the ride vehicles 14 may be adjusted. The disclosed techniques respond to such conditions by passively adjusting the angles of the panels (via deflection) forward or backward so that deflected panels 104 stay in contact with the plow structure.

The panels 104 may include features that enhance sliding or relative movement. For example, the panels may form a tail or tapered end whereby the lateral edges 128 that are covered by the turntable 18 in the closed configuration narrow towards the rod 168. Such an arrangement reduces surface area that may create friction or otherwise inhibit smooth transition between configurations while also maintaining desired coverage of the gap in the portions of the panel 104 that are exposed.

FIG. 6 illustrates a panel 104 of the first type 122 that may include additional features to aid transition between configurations. A bottom surface 200 of the panel of the first type 122, opposing the top surface 134 (see FIG. 4), may include one or more low-friction wear pads 202 or may be formed from or coated in a low friction material. In an embodiment, the bottom surface 200 of the panel of the first type 122, which slides relative to and is in contact with adjacent panels 104, may have a lower friction coefficient relative to the top surface 134. In addition, a stub shaft with bearings and an attachment lug 210 for connection to the spring assembly may be generally oriented towards the top surface 134 to avoid interfering with the relative movement of the bottom surface and the adjacent panels 104.

FIG. 7 illustrates a panel 104 of the second type 124. The panel 104 of the second type 124 may be generally similar to the panel 104 of the first type 122 (FIG. 6), but may be thicker to support vertical loads and the layer of panels 104 of the first type 122 that are positioned on the top surface 130 (FIG. 3). In an embodiment, the panel 104 of the second type 124 may be at least 50%, 100%, 200%, or 300% thicker than the panel of the first type 122 in the dimension 210 orthogonal to a bottom surface 220 thereof. The bottom surface 220 may be pocketed or may include one or more rib structures to facilitate support of additional weight. The panel 104 of the second type 124 may include a stub shaft 230 oriented downward to avoid contact with other panels. The panel 104 of the second type 124 may include an inboard wear strip 234 and/or a series of cam follower rollers 236 near the outboard edge to contact the loading platform structures and facilitate movement.

As set forth above, embodiments of the present disclosure may provide one or more technical effects useful for blocking access to portions of an amusement park attraction where guests may be likely to accidently lose certain personal items. In particular, the embodiments of the gap blocking system 72 disclosed herein facilitate loading and unloading of passengers into non-stationary ride vehicles 14, while access to the gap is substantially blocked. It should be understood that the technical effects and technical problems in the specification are examples and are not limiting. Indeed, it should be noted that the embodiments described in the specification may have other technical effects and can solve other technical problems and may be used outside of an amusement park setting.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gap blocking system, comprising:
   a loading platform; and
   a panel assembly comprising a plurality of panels configured to rotate with the loading platform, wherein each panel of the plurality of panels is coupled to a respective biasing mechanism that is coupled to the loading platform and configured to bias each panel towards a closed configuration in which each panel extends radially away from the loading platform, wherein the plurality of panels is arranged such that a first panel of the plurality of panels is positioned to overlap a portion of a top surface of a second panel of the plurality of panels that is adjacent to the first panel when the plurality of panels are in the closed configuration.

2. The gap blocking system of claim 1, wherein the first panel is positioned to overlap a top surface of a third panel, wherein the third panel is adjacent to the first panel and positioned such that the third panel and the second panel are spaced apart from each other when the first panel, the second panel, and the third panel are in the closed configuration.

3. The gap blocking system of claim 1, wherein the biasing mechanism comprises at least a spring, a spring-loaded rod, or a cam profile gasket.

4. The gap blocking system of claim 1, wherein the first panel is coupled to the biasing mechanism at a joint.

5. The gap blocking system of claim 4, wherein the first panel is configured to change orientation at the joint to move from the closed configuration to an open configuration.

6. The gap blocking system of claim 1, wherein the biasing mechanism comprises a free end positioned under the loading platform, wherein the free end is configured to move in response to a biasing force applied to the first panel.

7. The gap blocking system of claim 1, wherein the loading platform comprises a turntable or an in-line loading arrangement.

8. The gap blocking system of claim 1, wherein individual panels of the plurality of panels have a same shape relative to one another.

9. The gap blocking system of claim 1, wherein the first panel comprises a tapered end.

10. A method of gap blocking, comprising:
    providing a plurality of panels extending radially from a loading platform to block access to a gap; and
    rotating the loading platform such that at least one individual panel of the plurality of panels is deflected to overcome a biasing force of a biasing mechanism of the at least one individual panel to cause the at least one individual panel to move from a closed configuration into an open configuration, wherein the at least one individual panel at least partially slides over or under an adjacent panel to move to the open configuration.

11. The method of claim 10, comprising: controlling a ride vehicle to enter an opening providing access to the gap created by the at least one individual panel being in the open configuration.

12. The method of claim 11, comprising: controlling the ride vehicle to travel along a loading path at approximately a same speed as a rotational speed of the loading platform such that the ride vehicle maintains contact with the at least one individual panel subsequent to the at least one individual panel moving into the open configuration.

13. The method of claim 11, further comprising:
    contacting a second panel of the plurality of panels with a plow structure coupled to the ride vehicle to cause the second panel to at least partially move from the closed configuration to the open configuration.

14. The method of claim 10, wherein the at least one individual panel slides over the adjacent panel.

15. The method of claim 10, wherein the at least one individual panel slides under the adjacent panel.

16. A gap blocking system, comprising:
    a loading platform having a gap separating a first portion of the loading platform from a second portion of the loading platform;
    a ride vehicle; and
    a panel assembly coupled to the loading platform and comprising a plurality of panels configured to rotate with the loading platform, wherein adjacent panels of the plurality of panels overlap one another to block access to the gap and wherein the loading platform is configured to move relative to a deflector such that at least one panel of the plurality of panels is deflected via contact with the deflector to form an opening to permit entry of the ride vehicle.

17. The gap blocking system of claim 16, wherein every other panel of the plurality of panels are not in contact with one another in a closed configuration that blocks access to the gap.

18. The gap blocking system of claim 17, wherein the at least one panel is coupled to a biasing mechanism that biases the at least one panel in an extended configuration to block access to the gap when not deflected.

\* \* \* \* \*